Jan. 25, 1944.   J. S. PARSONS   2,340,075
ELECTRICAL DISTRIBUTION SYSTEM
Filed April 29, 1942   4 Sheets-Sheet 1

INVENTOR
John S. Parsons.
BY
ATTORNEY

Jan. 25, 1944. J. S. PARSONS 2,340,075
ELECTRICAL DISTRIBUTION SYSTEM
Filed April 29, 1942 4 Sheets-Sheet 3

WITNESSES:

INVENTOR
John S. Parsons.
BY
ATTORNEY

Jan. 25, 1944. J. S. PARSONS 2,340,075
ELECTRICAL DISTRIBUTION SYSTEM
Filed April 29, 1942  4 Sheets-Sheet 4

INVENTOR
John S. Parsons.
ATTORNEY

Patented Jan. 25, 1944

2,340,075

UNITED STATES PATENT OFFICE 2,340,075

ELECTRICAL DISTRIBUTION SYSTEM

John S. Parsons, Wilkinsburg, Pa., assignor to Westinghouse Electric & Manufacturing Company, East Pittsburgh, Pa., a corporation of Pennsylvania Application April 29, 1942, Serial No. 440,959

31 Claims. (Cl. 171—97)

This invention relates to electrical distribution systems, and it has particular relation to systems for distributing electrical energy from electrical generators to electrical loads operating at the generator voltage.

In conventional secondary network distribution systems, it is customary to distribute electrical energy at a plurality of voltages. For example, a plurality of feeder circuits energized at 4000 volts may supply electrical energy through network transformers to a secondary distribution circuit of the grid operating at approximately 440 volts. To assure proper operation of the distribution system, suitable protective devices are necessary. As employed in this specification, the expression "protective devices" designates devices such as circuit breakers, "limiters" and fuses for protecting electrical circuits. A "limiter" is a device for disconnecting a faulted cable from a distribution system and for protecting the unfaulted portions of the faulted cable against serious damage. The limiter comprises a circuit opening member which is heated and destroyed by the current passing therethrough.

The protective devices employed in secondary network distribution systems include network protectors for controlling the connection of feeder circuits to the secondary network distribution circuit or the grid. A modern secondary network distribution system is disclosed in my copending application, Serial No. 418,729, filed November 12, 1941, of which this is in part a continuation. This application is now Patent 2,300,465, issued November 3, 1942.

In accordance with the invention a distribution system is provided for supplying electrical energy directly from a plurality of electrical generators to electrical loads operating at the generator voltage. Such a system eliminates the requirement for network transformers and results in a substantial saving in weight, space and cost. This saving is particularly desirable in the case of warships such as light cruisers and destroyers, wherein compact equipment of light weight is required. As a further example of suitable applications for the invention, reference may be made to factories having low voltage generators available and having reasonably concentrated electrical loads.

In accordance with a further aspect of the invention, electrical energy is supplied from the generators to the electrical loads over a plurality of paths any of which may be destroyed without interrupting the service to the electrical loads. Preferably this system includes a plurality of loop distribution circuits which are connected at intervals by protective devices to form a single resultant loop distribution circuit. Such a distribution circuit is particularly suitable for energization directly from electrical generators.

The invention also contemplates a distribution system employing limiters as protective devices. Such a system is desirable for warships not only for the reason that limiters have less bulk and weight than conventionally employed circuit breakers, but for the further reason that limiters do not require blocking to prevent false operations under the influence of vibration and shock.

It is, therefore, an object of the invention to provide an improved electrical distribution system wherein electrical energy is supplied from electrical generators to electrical loads operating at the generator voltage.

It is a further object of the invention to provide an electrical distribution system wherein electrical energy is supplied from electrical generators over a plurality of paths to electrical loads, the paths being of proportions such that removal of one path does not result in an interruption of service.

It is a further object of the invention to provide an improved electrical distribution system wherein limiters are employed as protective devices.

It is still another object of the invention to provide an electrical distribution system having a plurality of loop distribution circuits connected at a plurality of points by protective devices to form a resultant loop distribution circuit.

Other objects of the invention will be apparent from the following description taken in conjunction with the accompanying drawings, in which.

Figure 1:
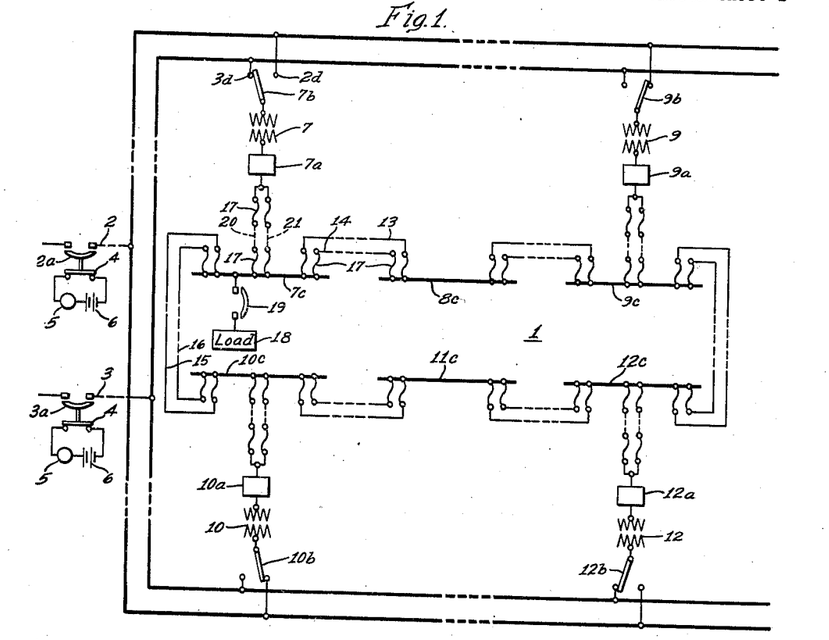
Figure 1 is a schematic view in single line of an electrical distribution system embodying certain aspects of the invention.

Referring to the drawings, Fig. 1 shows an electrical distribution circuit including a secondary network circuit or grid 1 which is energized from a plurality of feeder circuits 2 and 3. This system may be designed for single phase or polyphase operation. For purposes of illustration, it is assumed that the system of Fig. 1 is a three-phase alternating current system operating at a frequency of 60 cycles per second.

Each of the feeder circuits 2 and 3 is provided with a feeder circuit breaker 2a or 3a for controlling the connection of the associated feeder circuit to a suitable source of energy. Each of the feeder circuit breakers is designed to trip automatically in response to the condition of the associated feeder circuit when a fault occurs thereon. If the distribution system is of small extent, such as a system designed for a small factory, each of the feeder circuit breakers may be of the manual reclosing type.

If the distribution system is such that a fault occurring on the feeder circuit in certain cases may be self-clearing, each of the feeder circuit breakers preferably is of an automatic reclosing type. As an example of a suitable reclosing circuit breaker, such a breaker may reclose automatically three times after an initial tripping operation thereof at different time intervals. If a fault responsible for a tripping of the feeder circuit breaker fails to clear within the reclosing cycle thereof, the feeder circuit breaker then locks out in its open condition. Circuit breakers of this type are well known in the art.

Opening of a feeder circuit breaker may be indicated by a suitable signal device. For example, each feeder circuit breaker may be provided with back contacts 4 for closing a local circuit including a signal device 5 and a source of energy such as a battery 6. The signal device 5 may be in the form of an electric bell or lamp.

Connection of the network circuit or grid 1 to the feeder circuits is effected through a plurality of network transformers 7, 9, 10 and 12. In Fig. 1 the primary windings of the network transformers 7 and 12 are connected to the feeder circuit 3. The primary windings of the remaining transformers are connected to the feeder circuit 2. For controlling the connections of the network transformers to the network circuit or grid 1, a network protector 7a, 9a, 10a or 12a is interposed between the secondary winding of each network transformer and the network circuit or grid. The network circuit or grid may operate at a relatively low voltage, such as a phase-to-phase voltage of 208 or 440 volts.

As well understood in the art, a network protector generally is designed to remain closed when a fault occurs on the associated network circuit or grid. However, when a fault occurs on the associated feeder circuit, electrical energy flows from the network circuit or grid to the fault through one or more network protectors. This reversal in the direction of energy flow through a network protector trips the network protector to disconnect the fault feeder circuit from the network circuit or grid. In certain cases, it may be desirable to trip a network protector in response to excessive current flow therethrough to a network circuit or grid for appreciable periods of time. An example of a suitable network protector is described in greater detail in my Patent 2,082,024.

To eliminate the requirement for reserve or spare transformer capacity, the primary winding of each of the network transformers is provided with a switch 7b, 9b, 10b or 12b through which the associated network transformer may be selectively connected to either of the feeder circuits. For example, adjacent the switch 7b the feeder circuits 2 and 3 are provided with contacts 2d and 3d which may be selectively engaged by the switch 7b. If desired, each of the switches may also include a neutral position wherein the switch is disconnected from both of the feeder circuits.

When switches are provided as indicated in the preceding paragraph, each of the feeder circuits serves as a normal energizing source for half of the network transformers and as an emergency energizing source for the remaining network transformers. Should a permanent fault occur on one of the feeder circuits, the network transformers normally associated with the faulty feeder circuit may be connected to the remaining feeder circuit. In this case, all network transformers would be connected to a single feeder circuit, and would be available for supplying electrical energy to the network circuit or grid 1. For this reason substantially no reserve or spare transformer capacity is required.

Conveniently, the operation of the switches 7b to 12b may be entirely manually controlled. Such control is entirely adequate for small distribution systems. If desired, however, the movement of each switch from its normal connection to its emergency connection may be automatic, as in response to loss of voltage on its normal feeder circuit.

Generally, each transformer with its associated network protector and switch may be located adjacent each other. With such a positioning of the apparatus, a common enclosure may be provided for each network transformer and its associated network protector and switch.

Although the network circuit or grid 1 may be of conventional construction, a novel construction is shown in Fig. 1 which, together with the switches 7b to 12b, contributes to optimum performance of the distribution system under all conditions of operation.

The network circuit or grid 1 includes load buses 7c, 8c, 9c, 10c, 11c and 12c. Each adjacent pair of load buses is connected by a plurality of connecting circuits. For example, the load buses 7c and 8c are connected by a pair of connecting circuits 13 and 14. As a further example, the load buses 7c and 10c are connected by a pair of connecting circuits 15 and 16. The load buses, together with the connecting circuits, form a network loop circuit or grid. Each of the connecting circuits preferably is suitably segregated, as in a separate duct. With such segregation a fault on one connecting circuit does not affect the remaining connecting circuit. For example, if the connecting circuits 13 and 14 are three-phase circuits, the three phase-conductors of each of these circuits (together with the associated neutral conductor if four-wire distribution is employed) are installed in a separate conduit.

The advantages derived from the provision of a plurality of connecting circuits may be shown by an example. Should a fault occur on one of the connecting circuits, such as the circuit 13, the resultant flow of current to the fault operates to burn clear the connecting circuit 13 from the remaining circuit or grid. However, since the associated connecting circuit 14 remains intact, the remaining circuit or grid is not opened at any point.

Moreover, the provision of a plurality of connecting circuits may actually save copper. For example, assume that the connecting circuits 13 and 14 are formed of conductor having a 212,000 circular mil cross-section (this corresponds to a 4/0 conductor). A pair of such conductors has a higher current capacity than a single conductor having a 500,000 circular mil cross-section. Therefore, the provision of a plurality of connecting circuits not only improves the operation of the distribution system, but it may result in a saving in copper. Such a system also provides improved regulation at low power factors. As subsequently pointed out, more than two connecting circuits may be employed between each pair of load buses.

Small distribution systems may not have sufficient available energy to burn clear faults occuring on the connecting circuits. For this reason it may be desirable to provide limiters 17 at each end of a connecting circuit. A limiter may take the form of a heavy copper fuse or a weak link which opens with the customary fuse time delay when current above the normal rated capacity thereof passes therethrough. Such limiters assure the removal of a faulty connecting circuit from service. A current limiter inherently has an inverse time delay in blowing with respect to current.

As a general rule, the load buses 7c to 12c are relatively short compared to the connecting circuits. For this reason it is generally possible to provide additional insulation for the load buses. Consequently, the possibility of a fault at a load bus may, generally, be ignored.

Although loads may be connected to the connecting circuits, preferably the loads are connected directly to the load buses 7c to 12c. For example, in Fig. 1, load 18 is connected to the load bus 7c. If desired, each load may be connected to its associated load bus through an automatic circuit breaker 19. The loads may represent any desirable electric load such as electric lighting or electric motors. Preferably the limiters 17 are completely enclosed. Conveniently each load bus 7c, 8c, 9c, 10c, 11c or 12c and all of its adjacent limiters 17 may be enclosed in a suitable cabinet or enclosure E (Fig. 2), provided with terminals for receiving connecting circuits, load circuits and protector connections. If desired, the circuit breakers 19 may be placed in the associated enclosures E.

It is believed that operation of the distribution system shown in Fig. 1 is clear from the foregoing description. Under normal operating conditions, the network transformers 7 and 12 are connected to receive electric energy from the feeder circuit 3. The network transformers 9 and 10 are connected to receive electric energy from the feeder circuit 2. Consequently, all network transformers are in service to supply electric energy to the network circuit 1.

Should a fault occur at one of the loads 18, the circuit breaker 19 associated with the faulty load opens to disconnect the load from its associated load bus. Except for the faulty load, the distribution system continues in normal operation.

In the event that a fault occurs on one of the connecting circuits such as the connecting circuit 13, excessive current flows to the connecting circuit from the rest of the network circuit or grid 1. This excessive current operates to blow the limiters at each end of the connecting circuit 13. Since the associated connecting circuit 14 remains intact, the network circuit or grid 1 remains unbroken, and the system continues in operation except for the connecting circuit 13.

As previously pointed out, it is extremely unlikely that faults can occur on the load buses. For completeness, however, it is here assumed that a fault occurs on the load bus 7c. The resulting flow of current to the faulty load bus through the connecting circuits 13, 14, 15 and 16 results in the blowing of at least one limiter in each of these connecting circuits. This effectively isolates the load bus 7c from the remainder of the network circuit or grid 1. Such a fault also may result in the blowing of limiters in the connecting circuits between the load buses 8c and 9c.

The performance of the network protector 7a depends upon its construction. If it is designed to trip in response to excessive current flowing therethrough, it will open to isolate the load bus 7c from the feeder circuits. Such operation of the network protector removes the network transformer 7 from service and permits the remainder of the network circuit or grid 1 to continue in operation, receiving energy from the network transformers 8 to 12.

Assuming that the network protector 7a trips only in response to a reversal in the direction of energy flow therethrough, the fault on the load bus 7c will not result in an opening of the network protector 7a. In such a case, fuses generally provided in the network protector "blow" to remove the protector from service.

A fault occurring on one of the feeder circuits such as the feeder circuit 3 results in a flow of electric energy from the network circuit or grid 1, through the network protectors 7a and 12a. The reversal in the direction of energy flow through these protectors opens the protectors to disconnect the associated network transformers from the network circuit or grid.

The fault on the feeder circuit 3 also results in a tripping of the feeder circuit breaker 3a. If the feeder circuit breaker 3a is of the automatic reclosing type, it immediately enters its reclosing cycle. Should the fault on the feeder circuit 3a clear before the completion of the reclosing cycle, the feeder circuit breaker 3a recloses and remains closed. The closure of the feeder circuit breaker places the network transformers 7 and 12 in condition to supply electric energy to the network circuit or grid 1. If the associated network protectors are of the manual reclosing type, a manual reclosure of each of these network protectors restores the entire system to its normal condition. If the network protectors 7a, and 12a are of the automatic reclosing type, they reclose automatically to restore the entire system to its normal condition.

However, if the fault occurring on the feeder circuit 3 is of permanent nature or if the feeder circuit breaker 3a is of the manually reclosing type, the feeder circuit breaker remains in its open condition. If the switches 7b and 12b are automatic in operation, they transfer, thereby connecting their associated transformers to the feeder circuit 2. In the event the circuit breaker 3a is of the automatic reclosing type, preferably this operation of the switches is accompanied by a time delay in order to permit the circuit breaker to go through its reclosing cycle.

If the switches 7b and 12b are of the manually operable type, an attendant operates these switches to connect the associated transformers to the sound feeder circuit 2. Such operation of the circuits restores all of the network transformers to service, and eliminates the requirement for reserve or spare capacity thereof. Since a transformer generally has a high overload capacity for short periods, such as one hour, the transformers 9 and 10 are capable of carrying the network circuit or grid load until the switches 7b and 12b are operated.

After the feeder circuit 3 has been repaired, the switches 7b and 12b may be manually restored to the positions illustrated in Fig. 1. The system then may be placed in condition for its normal operation.

Figure 2:
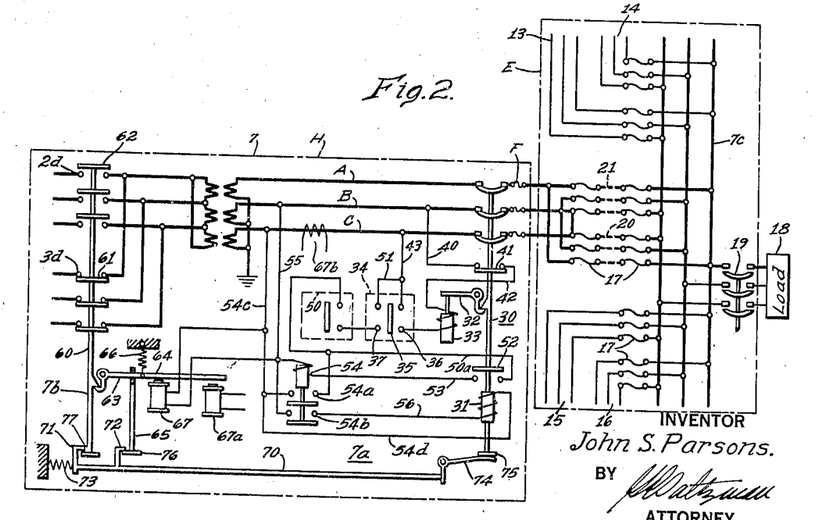
Fig. 2 is a schematic view in greater detail of a portion of the system illustrated in Fig. 1.

In Fig. 2, the load bus 7c and the equipment associated therewith are illustrated in greater detail. Conveniently, the transformer 7 may have a delta-connected primary winding and a star-connected secondary winding. However, other suitable connections thereof may be employed. Fuses F may be provided between the transformer and the network circuit. These fuses "blow" only if subjected to excessive current for a time sufficient to permit prior operation of the associated protector or the network circuit limiters 17. In Fig. 2 the three phase circuit is illustrated as having phase conductors A, B, C.

The network protector 7a includes a network circuit breaker 30 having a closing motor or solenoid 31. The network circuit breaker 30 is held in closed position by means of a tripping latch 32 which is operated by a tripping solenoid 33.

The tripping of the network circuit breaker 30 is controlled by a directional master relay 34 having a movable contact 35 which may be actuated into engagement with either a pair of tripping contacts 36 or a pair of closing contacts 37. Engagement of the movable contact 35 with the tripping contacts 36 completes a tripping circuit for the tripping solenoid 33 which may be traced from the phase conductor B of the associated polyphase circuit through a conductor 40, front contacts of a pallet switch 41, a conductor 42, the energizing coil of the tripping solenoid 33, the tripping contacts 36 and a conductor 43 to the phase conductor C of the associated circuit.

The design of the master relay 34 is well known in the art. For example, suitable constructions for the master relay are shown in my Patent 1,973,097 and 2,013,836.

Although the network circuit breaker 30 may be manually reclosed, preferably it is automatically reclosed when the conditions across its poles are such that energy will flow from the associated feeder circuit to the network circuit or grid. For controlling the closure of the network circuit breaker, a phasing relay 50 may be employed in addition to the master relay 34. A suitable construction for the phasing relay 50 is shown in somewhat greater detail in my Patents 1,997,697 and 2,082,024.

If the network circuit breaker 30 is in open condition and if the conditions across its poles are such that electric energy will be supplied from the associated feeder circuit to the network circuit or grid, a closing circuit for the network circuit breaker is set up which may be traced from the phase conductor C through the conductor 43, a conductor 51, the closing contacts 37 of the master relay, the contacts of the phasing relay 50, back contacts of a pallet switch 52, a conductor 53, the energizing winding of a closing relay 54 and a conductor 55 to the phase conductor B. Upon completion of this circuit, the closing relay 54 picks up to close its front contacts 54a and 54b. Closure of the front contacts 54a of the relay 54 establishes a sealing circuit which operates to hold the relay contacts closed. Closure of the front contacts 54b of the closing relay 54 completes a circuit for the closing motor or solenoid 31 which may be traced from the phase conductor C through the conductor 54c, the conductor 54d, the energizing winding of the motor or solenoid 31, a conductor 56, the front contacts 54b of the closing relay 54, and the conductor 55 to the phase conductor B. Completion of this circuit results in the closure of the circuit breaker 30.

The switch 7b make take the form of an operating rod 60 having a plurality of contacts 61 normally in engagement with the front contacts 3d. The rod 60 also carries a plurality of contacts 62 for engaging the back contacts 2d. Under normal conditions of operation, the contacts 61 are maintained in engagement with the front contacts 3d by means of a latch 63 having an operating arm 64. Tripping of the latch 63 permits the switch 7b to drop. Such dropping of the switch opens the front contacts 3d and closes the back contacts 2d. Operation of the latch 63 may be effected through an operating rod 65 having an opening or eye through which the arm 64 extends. Movement of the operating rod 65 in an upward direction as viewed in Fig. 2 trips the switch 7b to actuate the switch from its normal condition illustrated in Fig. 2 to its emergency position wherein the back contacts 2d are closed.

As previously explained, the switch 7b generally may be designed for manual operation. In certain cases, however, automatic operation of the switch may be desired. In such cases, a spring 66 may be added for biasing the tripping latch 63 towards its tripping position. A solenoid 67 may be connected across the phase conductors B and C. For this case the arm 64 is formed of magnetic material. The solenoid, when energized, operates to maintain the tripping latch 63 in latching position. The relationship between the spring 66 and the solenoid 67 is such that for normal values of voltage the solenoid 67 exerts a predetermined torque maintaining the tripping latch 63 in latching position. When the voltage applied to the solenoid 67 drops below a predetermined value such as thirty per cent of normal, the torque exerted by the spring 66 overcomes the torque exerted by the solenoid and moves the tripping latch into tripping position. This permits the switch 7b to drop from its normal to its emergency position.

A fault near the network protector 7a may drop the voltage applied to the solenoid 67 sufficiently to permit a tripping operation of the switch 7b despite the fact that the switch is carrying substantial current. To avoid such operation, an additional solenoid 67a may be energized from a current transformer 67b (connections not shown in full) to prevent tripping of the latch 63 when the switch carries substantial current. Under such conditions the solenoid 67a retains the magnetic arm 64 in its latching position against the pull of the spring 66.

As a general rule, the switch 7b, the network transformers, and the network protector 7a may be grouped into a compact unit provided with a common enclosure H represented in Fig. 2 by broken lines.

As previously explained, it is desirable that the switch 7b be operable only when the current flowing through the switch is substantially below the rated load current thereof. With the grouping of parts illustrated in Fig. 2, such control of the switch 7b conveniently may be effected by interlocking the switch 7b with the network circuit breaker 30. This interlocking permits operation of the switch 7b only when the network circuit breaker 30 is in open condition. With such interlocking, the maximum current passing through the switch 7b during an operation thereof is restricted to the magnetizing current flowing to the network transformer 7.

For interlocking the switch 7b with the circuit breaker 30, an interlocking rod 70 is provided which extends between the switch 7b and the network circuit breaker 30. This rod is provided with two latching fingers 71 and 72 which are urged towards latching position by means of a suitable spring 73. Movement of the latching fingers 71 and 72 away from latching position is effected by a bell crank 74 having an arm extending beneath a disk 75 carried by the network circuit breaker 30.

When the network circuit breaker 30 is in its closed position, the spring 73 urges the rod 70 to the right as viewed in Fig. 2. This is the direction of movement required to bring the latching fingers 71 and 72 into latching position. When the circuit breaker 30 opens, engagement of the disk 75 with the bell crank 74 operates the bell crank in a clockwise direction, as viewed in Fig. 2, to urge the rod 70 towards the left against the bias of the spring 73. Such movement of the rod 70 carries the latching fingers 71 and 72 out of latching engagement with the switch rod 60 and the operating rod 65.

By inspection of Fig. 2, it will be observed that the latching finger 72 normally overhangs a disk 76 carried by the operating rod 65. Similarly the latching finger 71 is positioned for movement over a lug 77 carried by the switch rod 60.

With the parts in the positions shown in Fig. 2, the latching finger 72 prevents the actuation of the operating rod 65 either manually or by the spring 66 to trip the switch 7b. Tripping of the circuit breaker 30 is required to actuate the rod 70 and the latching finger 72 out of latching position. Therefore, the switch 7b cannot be tripped unless the circuit breaker 30 is in open condition.

When the switch 7b trips, the lug 77 drops sufficiently to permit the latching finger 71 to move over the lug 77. Reclosure of the network circuit breaker 30 permits the spring 73 to move the latching finger 71 into latching position over the lug 77. In this position the latching finger 71 prevents operation of the switch rod 60 in an upward direction as viewed in Fig. 2. It should be noted that the upward motion of the operating rod 65 is sufficient to carry the disk 76 above the latching finger 72. This permits the rod 70 to move freely to the right, when the circuit breaker 30 is closed, in order to bring the latching finger 71 over the lug 77. The latching finger 71 remains over the lug 77 as long as the network circuit breaker 30 is in closed condition. Therefore, the network circuit breaker 30 must be opened before the switch 7b can be restored to the position illustrated in Fig. 2.

From the foregoing discussion it will be appreciated that the switch 7b can be operated only when the network circuit breaker is in open condition. Therefore, the switch 7b need not be designed to interrupt substantial current, and a considerable saving in complexity, space, weight and cost may be effected. Since the interlock permits operation of the switch 7b only when the protector is open, the solenoid 67a may be omitted, if desired, when such an interlock is provided.

If the network protectors 7a, 9a, 10a and 12a are located adjacent to their associated load buses they may be connected directly thereto. For the purpose of illustration it is assumed that they are spaced from their associated load buses by substantial distances. For connecting each network protector to its associated load buses a plurality of connecting circuits may be employed. For example, the network protector 7a is connected to its load bus 7c through two circuits 20 and 21. Each of these circuits has a limiter 17 at each end thereof. When a fault occurs on one of the circuits, such as the circuit 20, the limiters at each end of the circuit blow to remove the circuit from service. The remaining circuit 21 continues to transmit electrical energy from the network protector 7a to the associated load bus 7c.

The circuits illustrated in Figs. 1 and 2 are discussed in greater detail in my aforementioned copending application. As therein pointed out, network protectors and transformers may be associated with all of the load buses or with only certain of the load buses. As also pointed out in my aforesaid copending application, it is preferable that no connecting circuits extending directly between the load buses 8c and 11c be employed. That is, the distribution circuit 7 is substantially a loop circuit. Such a circuit tends to restrict current flowing to faults occurring at any point on the loop circuit to reasonable maximum values.

Figure 3:
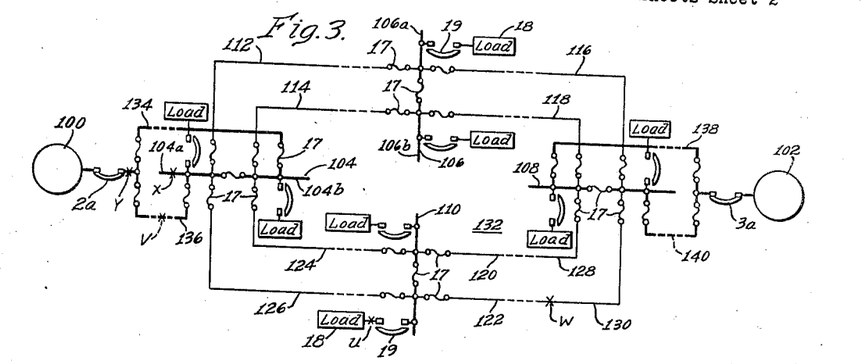
Fig. 3 is a schematic view in single line of an electrical distribution system embodying the invention.

The loop circuit of Fig. 1 is admirably adapted for energization directly from electrical generators. This is illustrated in Fig. 3 wherein a pair of generators 100 and 102 are provided. These generators may be single-phase or polyphase generators, but for the purpose of discussion it is assumed that these generators are three-phase generators having a phase-to-phase voltage of the order of 460 volts.

For receiving electrical energy from the generators a plurality of load buses 104, 106, 108 and 110 are provided which correspond to the load buses 7c to 12c of Fig. 1. To simplify the discussion and illustration only four load buses and two generators are shown in Fig. 3. Each pair of these buses is connected by a pair of connecting circuits. For example, the load buses 104 and 106 are connected by connecting circuits 112 and 114. The load buses 106 and 108 are connected by circuits 116 and 118. The load buses 108 and 110 are connected by circuits 120 and 122. The load buses 104 and 110 are connected by circuits 124 and 126. As previously pointed out, each connecting circuit preferably is segregated in a separate duct or conduit.

By inspection of Fig. 3, it will be observed that each of the load buses is divided into two sections identified by the subscripts a and b which are connected by a protective device such as a limiter 17. For example, the bus 104 includes two sections 104a and 104b which are connected by a limiter. It will be observed further that each of the connecting circuits is connected to each of its associated buses through a protective device such as the limiter 17. In Fig. 3, the connecting circuits 112, 116, 122 and 126 form a loop circuit 130 which is connected through limiters to a second loop circuit 128 comprising the connecting circuits 114, 118, 120 and 124 to form a resultant loop distribution circuit 132.

Preferably the electrical loads 18 connected to each load bus are divided into two substantially equal portions. Each of these portions is connected to a separate section of the associated load bus through protective devices 19 which may take the form of magnetic or thermal type automatic circuit breakers. This division of the load assures service to a portion of the load even though one of the load bus sections is removed from service.

Each of the generators is connected to one of the load buses through a plurality of feeder circuits. In the specific embodiment of Fig. 3, two feeder circuits are provided for each of the generators. For example, the generator 100 is connected to the load bus 104 through two feeder circuits 134 and 136. Similarly the generator 102 is connected to the load bus 108 through two feeder circuits 138 and 140. It will be observed that each end of each feeder circuit includes a suitable protective device such as the limiter 17. The groups of feeder circuits may be connected to their associated generators through the circuit breakers 2a and 3a.

Figure 4:
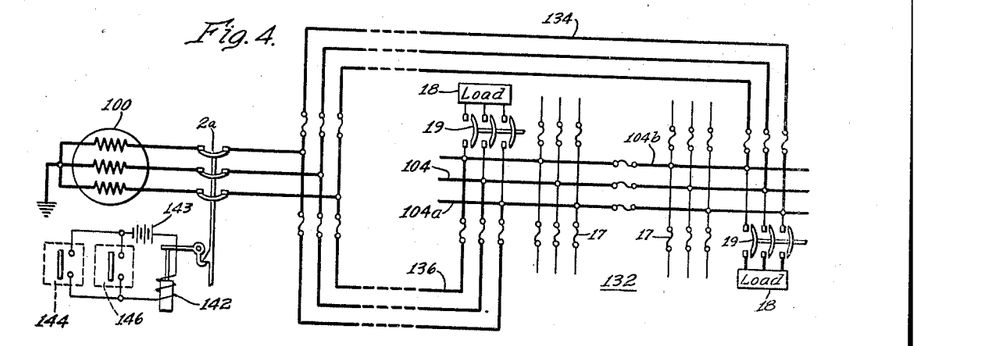
Fig. 4 is a schematic view in greater detail of a portion of the system illustrated in Fig. 3, Figs. 5 and 6 are schematic views in single line illustrating modifications of the system shown in Fig. 3.

The circuit breakers 2a and 3a may be manually operated. It is assumed, however, that these circuit breakers are of the automatically tripped type. For example, the circuit breaker 2a may have a tripping solenoid 142, as illustrated in Fig. 4. This tripping solenoid is connected for energization from a suitable energizing source such as a battery 143 by either of two relays 144 or 146. These relays may be of conventional construction. For example, the relay 144 may be a differential relay for tripping the circuit breaker 2a in response to the occurrence of a fault in the generator 100. Alternatively the relay 144 may be a directional relay having a high current setting and designed to operate with little time delay. When current flows from the distribution circuit 132 to a fault in the generator 100, the directional relay trips the circuit breaker 2a.

The relay 146 may be a conventional overcurrent relay having a time delay sufficient to permit prior operation of the protective devices associated with the feeder circuits and with the distribution circuit 132.

The generators 100 and 102 are so designed that either alone can carry the entire system load. This means that when both of the generators 100 and 102 are supplying electrical energy to the distribution circuit, each is operating at a maximum of 50% of its normal rating.

Each pair of feeder circuits preferably has a rating sufficient to carry continuously the overload rating of the associated generator. For example, if the generator 100 has an overload rating equal to 130% of its normal continuous rating, each of the feeder circuits 134 and 136 may have a continuous rating equal to 65% of the normal continuous rating of the generator. With such a rating each feeder circuit alone can carry the portion of the system load normally supplied by its associated generator. Each of the load buses and each of the connecting circuits preferably has the same rating as one of the feeder circuits. All of the limiters 17 preferably have the same time delay characteristic with respect to current in blowing.

The number of generators associated with the distribution system and the number of load buses which are not connected directly to generators may be varied as desired. In Fig. 3, two genera- tors are shown attached respectively to load buses 104 and 108. The two remaining buses 106 and 110 are not connected directly to generators.

Figure 5:
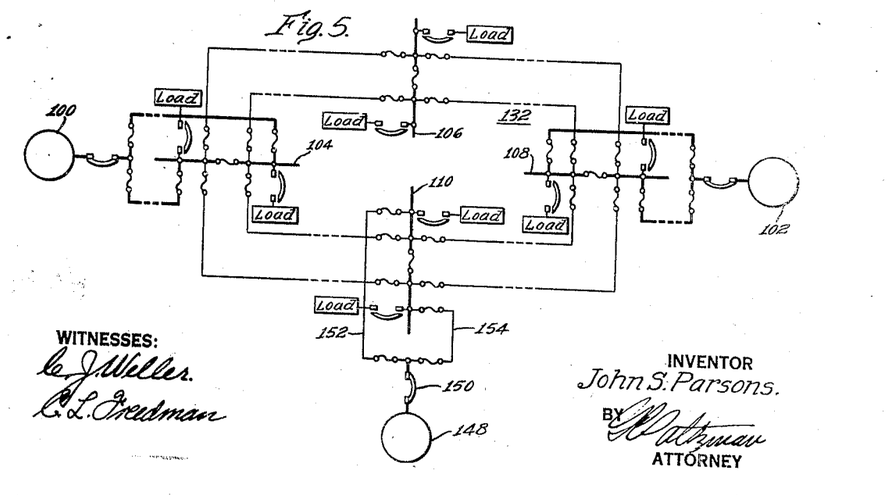

As a further example of the flexibility of the system, Fig. 5 shows a system which is similar to Fig. 3 except for the addition of a third generator 148, which is connected to the load bus 110 through a circuit breaker 150 and feeder circuits 152 and 154. In Fig. 5, the load bus 106 is the only load bus which is not connected directly to a generator.

In order to reduce spare generator capacity, all of the generators preferably are of the same size. However, should the generators vary in capacity, the loop distribution circuit 132 is designed to carry continuously the overload current rating of the largest of the generators.

It is believed that the operation of the distribution system illustrated in Fig. 3 now may be set forth. Let it be assumed that the system is operating normally with both of the generators 100 and 102 supplying electrical energy to loads connected to all of the load buses. Should a fault occur on one of the loads 18, such as the fault U, the load protective device, which is illustrated as a circuit breaker 19, interrupts the connection of the load 18 to the load bus 110. The characteristic of the circuit breaker 19 or other protective device associated with the load preferably is such that the circuit breaker operates in advance of the limiters 17. Since fault current flowing through the circuit breaker 19 divides among a plurality of limiters 17, the required selectivity readily may be obtained. After the disconnection of the faulty load, the remainder of the distribution system continues in operation.

If a fault W occurs on one of the connecting circuits such as the connecting circuit 122, the fault current flows through the limiter 17 at each end of the faulty connecting circuit. Consequently, these limiters blow to disconnect the faulty connecting circuit 122 from the associated load buses 108 and 110. Since the fault current flowing through the fault W divides between at least two limiters external to the conducting circuit 122, only the limiters connected with the faulty circuit blow. Therefore, the effect of the fault W is to disconnect only one connecting circuit from the distribution system.

The load buses generally are relatively short compared to the connecting circuits and may be well insulated. For this reason, the possibility of a fault occurring on one of the load circuits is remote. Let it be assumed, however, that a fault X occurs on one of the load buses 104. As a result of this fault X, fault current flows from the feeder circuit 134 and the connecting circuits 114 and 124 through the limiter connecting the two load sections 104a and 104b. This limiter consequently blows to disconnect the two load bus sections. Fault current also flows through the feeder circuit 136 and the connecting circuits 112 and 126 to the fault. Consequently, at least one limiter in each of these circuits blows to complete the disconnection of the load bus section 104a from the remainder of the system. The only effect of the fault is to interrupt service to loads connected to the faulty bus section 104a.

Although the limiters connecting the load bus sections may be omitted and the bus sections connected permanently together (as shown in Fig. 1), the limiters are desirable, particularly for those systems having load buses which are not connected directly to generators. This may be understood more fully by assuming that the various bus sections such as the sections 104a and 104b of Fig. 3 are connected permanently together. In such a case, fault current flows through the connecting circuits 112 and 114 to the fault X. This same current also flows through the connecting circuits 116 and 118. In addition, the connecting circuits 116 and 118 supply some current to loads connected to the load bus 106. For this reason, a fault occurring on the load bus 104 probably would result in the blowing of limiters to the right of the load bus 106. Furthermore, all other circuits supplying current to the faulty load bus 104 would be disconnected therefrom by operation of their associated limiters. This means that both of the load buses 104 and 106 would be completely deenergized in response to a fault occurring only on the load section 104a. As a matter of fact, if no limiters were employed between the load bus sections in the specific system of Fig. 3, a fault occurring on one of the load buses probably would result in the loss of the entire system load.

Should a fault occur on one of the feeder circuits, such as the fault V of the feeder circuit 136, the limiters associated with the faulty feeder circuit blow to disconnect the feeder circuit from the remainder of the system. It will be observed that the generator 100 remains connected to its load bus through the sound feeder circuit 134.

The connection between each of the generators and its feeder circuits generally is short and may be well insulated. For this reason, the possibility of a fault in this connection, such as the fault Y, may be generally disregarded. However, should the fault Y occur, it is probable that the entire system load would be dropped. This is for the reason that substantially the same fault current flows in all of the feeder circuits 134, 136, 138 and 140. Although it is possible that the current limiters in the feeder circuits 134 and 136 will blow first, it is more probable that the current limiters in the feeder circuits 138 and 140 will blow first or that the current limiters in all feeder circuits will blow substantially at the same time. Since the circuit breakers 2a trips to disconnect the generator 100 from the fault Y, it follows that the entire system load would be dropped.

If the possibility of a fault Y occurring in the connection between a generator and its feeder circuit cannot be disregarded, it may be desirable to employ network protectors in place of limiters at the load end of the feeder circuits. Such network protectors are illustrated in Figs. 6 to 11 and will be discussed more fully below.

Let it be assumed that one of the generators such as the generator 100 is out of service at the time a fault occurs on the distribution system. Although such a case is improbable, a fault may occur under these circumstances. Proper selectivity in the operation of the current limiters may not be obtained. For example, the fault V on the feeder circuit 136 would result in the flow of substantially equal fault currents in all four of the feeder circuits. In addition, the feeder circuits 138 and 140 supply current to whatever load is connected to the system. For this reason, it is probable that the fault V would result in the blowing of limiters in the feeder circuits 138 and 140 or the blowing of limiters in all four of the feeder circuits. Proper operation of the system under these circumstances may be obtained by replacing each of the four feeder circuits with a pair of parallel feeder circuits each provided with current limiters. Each of the pair of feeder circuits would have a continuous current capacity equal to approximately 35 to 40% of the overload current rating of the associated generator. When each of the generators is connected in this manner through four feeder circuits to its associated load bus, fault current flowing to a fault on one of the feeder circuits must divide among a plurality of remaining feeder circuits. Consequently, such a fault results in disconnection only of the faulty feeder circuit. This modification will be discussed further in connection with Fig. 11.

In Fig. 3, the loop distribution circuit 132 is composed of two loop circuits 128 and 130 and two feeder circuits for each generator. To assure proper selectivity under all conditions, the loop distribution circuit may be formed of three or more associated loop circuits and each of the generators may be connected to the loop distribution circuit through three or more feeder circuits, as illustrated in Fig. 6.

Figure 6:
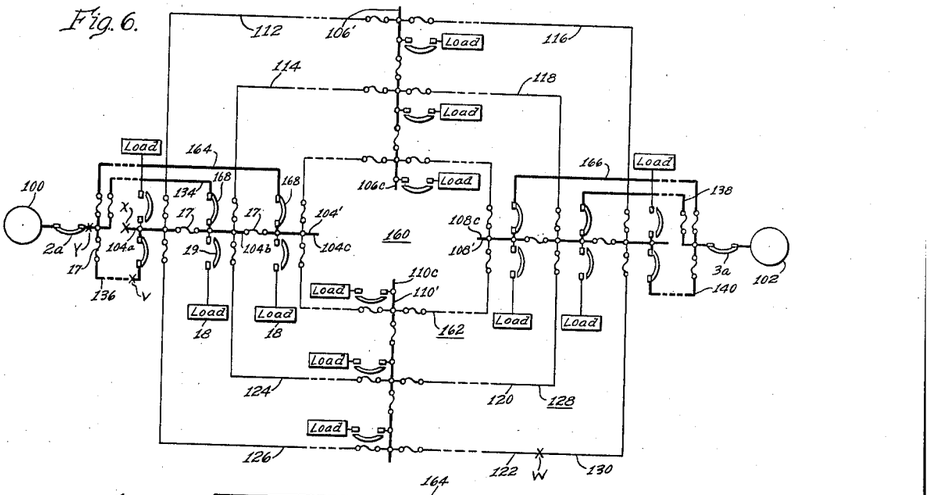
Figure 7:
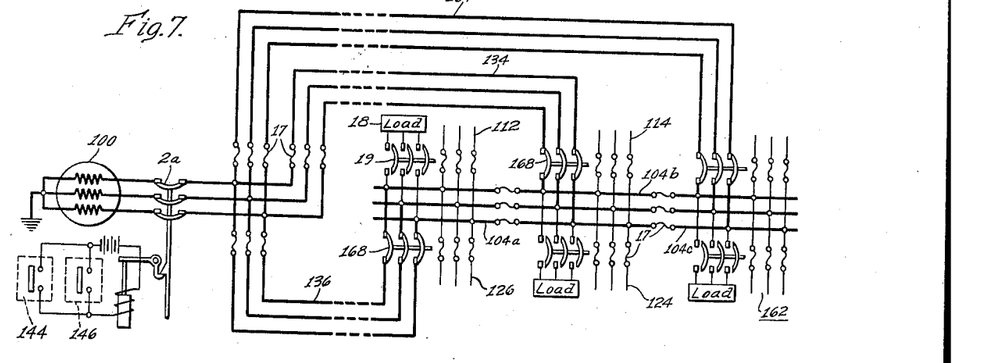
Fig. 7 is a schematic view showing in greater detail a portion of the system illustrated in Fig. 6.

Referring to Fig. 6, a loop distribution circuit 160 is illustrated which includes the loop circuits 128 and 130 and, in addition thereto, a third loop circuit 162 which is similar to the loop circuits 128 and 130. Four load buses 104', 106', 108' and 110' are illustrated which correspond respectively to the load buses 104, 106, 108 and 110 illustrated in Fig. 3. Each load bus in Fig. 6 differs from its corresponding load bus in Fig. 3 by the addition of a third load bus section. For example, the load bus 104 includes not only the sections 104a and 104b but in addition thereto includes a third section 104c which is connected to the load section 104b through a protective device such as the limiter 17. In a similar manner, each of the three load buses in Fig. 6 includes a third section 106c, 108c and 110c, respectively. These third bus sections are associated with the third loop circuit 162.

Although electrical loads may be connected to the various bus sections as desired, preferably the load connected to each of the buses is divided into three substantially equal parts. Each of the portions is connected to a separate section of the associated load bus.

In addition to the feeder circuits 134 and 136, the generator 100 has a third feeder circuit 164 which is connected to the third load bus section 104c. Similarly, the generator 102 has a third feeder circuit 166 which is connected to the third load bus section 108c.

The three feeder circuits associated with each generator preferably should have sufficient capacity to carry continuously the overload rating of the associated generator. With one of the three feeder circuits out of service, the remaining two feeder circuits preferably should have sufficient capacity to carry continuously the portion of the system load normally supplied by the associated generator.

Although the feeder circuits 134, 136, 138, 140, 164 and 166 of Fig. 6 may be provided with protective devices in the form of limiters at each end in the manner disclosed in Fig. 3, Fig. 6 illustrates these feeder circuits as provided with network protectors 168 at their load ends. As previously explained, the network protector is a directionally controlled circuit breaker which trips in response to a flow of power from the loop distribution circuit 116 to the associated feeder circuit. The network protector remains closed when current flows from the feeder circuit to the loop distribution circuit. A suitable construction for the network protector 168 is disclosed in my aforesaid patents.

When employed for a single voltage system of the type illustrated in Figs. 3 and 6, the network protector 168 preferably is designed for insensitive operation. For example, the network protector 168 may be designed to trip in response to power reversals of small magnitude with substantial time delay. A network protector of this type is disclosed in the Edson Patent 2,112,081. One purpose of the insensitive setting of the network protector is to prevent operation of the network protector in response to brief reversals of power flow such as those caused by synchronizing surges of circulating current between the generators 100 and 102.

It is believed that the operation of the system disclosed in Fig. 6 is apparent from the description of Fig. 3. In response to fault current flowing to the fault W, only the limiters associated with the connecting circuit 130 blow. Consequently, the entire system with the exception of the connecting circuit 130 remains in operation.

Should the fault X occur on the load bus section 104a, the current limiter 17 connecting the bus sections 104a and 104b blows. In addition, at least one of the limiters in each of the circuits 112 and 126 blows. If the network protector 168 and the feeder circuit 136 includes overcurrent tripping as well as directional tripping, the network protector 168 may trip to complete the isolation of the bus section 104a. In this case, the overcurrent tripping control of the network protector 168 should have substantially the same time current characteristics as the limiter 17.

If the network protector 168 does not have overcurrent tripping control, the current limiter 17 in the feeder circuit 136 trips to complete the isolation of the load bus section 104a.

In response to a fault V on the feeder circuit 136, the limiter associated with the feeder circuit blows. This is true even though the generator 100 happens to be out of service. Since three feeder circuits are associated with each of the generators, it follows that fault current flowing through the limiter 17 in the feeder circuit 136 must divide between at least two limiters in the remaining feeder circuits. For this reason, proper selectivity is obtained even though one of the generators is out of service.

In the event that the protective device 168 in the feeder circuit 136 is a current responsive device such as a limiter, the protective device also opens to complete the disconnection of the faulty feeder circuit 136 from the remainder of the system. For the purpose of discussion it is assumed that the protective device 168 is a network protector which trips promptly in response to the reversal in the normal direction of power flow caused by the fault V. Since the distribution system illustrated in Fig. 6 maintains proper selectivity under all conditions, it is particularly desirable for systems having three or less generators associated therewith.

Although only four load buses and two generators are shown in Fig. 6 for simplicity, as previously illustrated and discussed additional load buses and generators may be employed as desired.

Figure 8:
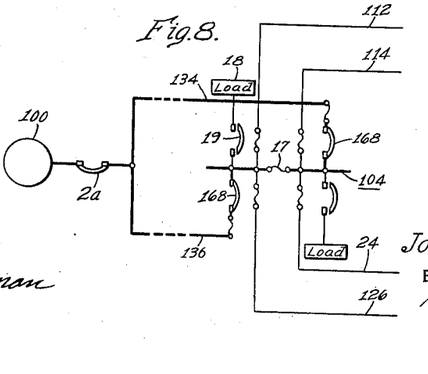
Fig. 8 is a schematic view in single line representing a modification of the invention.

In Fig. 8, an alternative connection for each of the generators to the loop distribution circuit is illustrated. In this modification, each of the generators is connected to the loop distribution circuit through a plurality of feeder circuits each of which has only a network protector therein.

For example, in Fig. 8, two feeder circuits 135 and 136 are provided with the network protectors 168 at their load ends. It will be observed that no limiters or other protective devices are employed at the generator end of these feeder circuits. If the circuit breaker 2a is a manually operated circuit breaker, the protective devices, such as the network protectors 168 in the load ends of the feeder circuits 134 and 136 operate for faults occurring not only in the feeder circuits 134 and 136, but for faults occurring in the generator 100. If the circuit breaker 2a is of the automatic type previously discussed, it also operates for faults occurring on the feeder circuits and in the generator.

Figure 9:
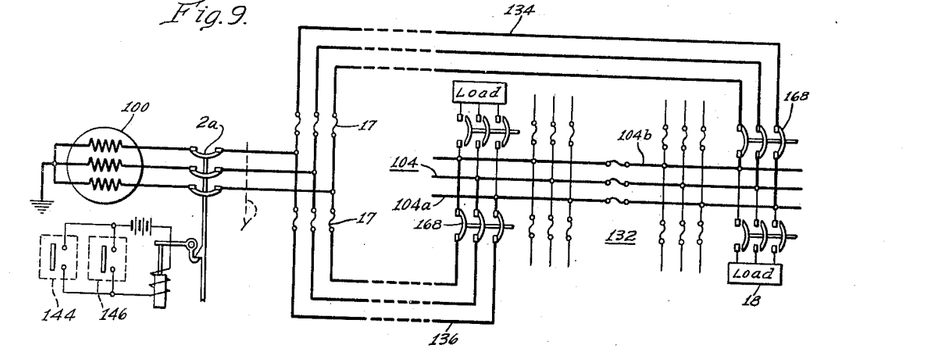
Figs. 9 and 10 are schematic views showing further modifications of the invention.

Fig. 9 illustrates a modification suitable for connecting the generator 100 to the distribution circuit of Fig. 3. In this modification, the limiters 17 at the load ends of the feeder circuits 134 and 136 are replaced by network protectors 168. These network protectors are designed to trip in response to a reversal in the direction of power flow therethrough, with a time delay somewhat less than the time delay required for blowing of the limiters 17. Consequently, in response to the fault Y between the circuit breaker 2a and the feeder circuits 134 and 136, the network protectors 168 trip before the limiters 17 can blow. Therefore, the modification of Fig. 9 provides correct selectivity even for the fault Y. As previously explained in connection with Fig. 3, the provision of limiters at each end of each feeder circuit may result in incorrect selectivity for the fault Y.

Figure 10:
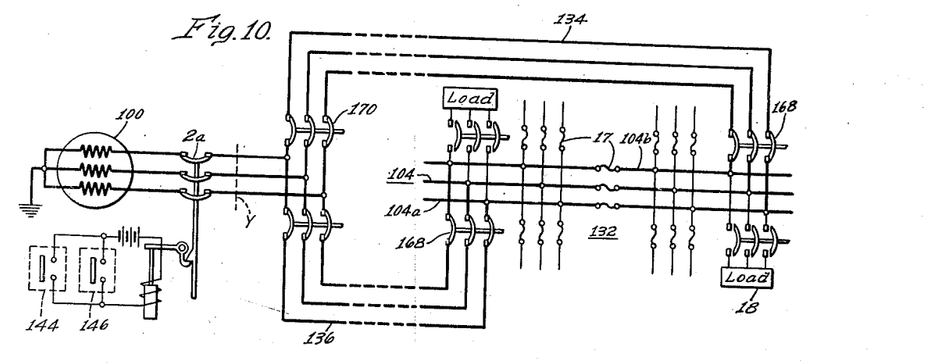

Fig. 10 differs from Fig. 9 only in the provision of circuit breakers 170 in place of the current limiters 17 in the generator ends of the feeder circuits 134 and 136. Such circuit breakers 170 are designed for overcurrent tripping with a time delay sufficient to permit prior operation of the network protectors 168 in response to fault current flowing to the fault Y. The circuit breakers 170 may be manual reclosing breakers.

Figure 11:
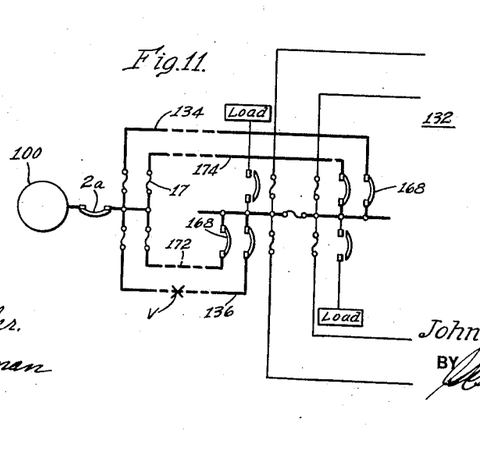
Fig. 11 is a schematic view in single line showing still another modification of the invention.

In Fig. 11, a further modification for connecting the generator 100 to the distribution circuit 32 of Fig. 3 is illustrated. This modification is designed to provide proper selectivity even for a fault V occurring on the feeder circuit 136. As shown in Fig. 11, a pair of auxiliary feeder circuits 172 and 174 are provided which are in parallel respectively with the feeder circuits 136 and 134. A suitable protective device, such as a limiter or circuit breaker, is provided at each end of each of the feeder circuits. In the specific embodiment of Fig. 11, limiters are provided at the generator ends of the feeder circuits and network protectors 168 are provided at the load ends of the feeder circuits. Each of the feeder circuits may be designed to carry continuously approximately 35 to 40% of the overload current rating of the associated generator 100. When the fault V occurs on the feeder circuit 136, current flowing to the fault must divide among at least two of the remaining feeder circuits. Consequently, correct selectivity for the fault is obtained and the protective devices associated only with the faulty feeder circuit 136 operate to disconnect the feeder circuit from the remainder of the system.

From the foregoing discussion, it will be apparent that under some conditions it may be desirable to employ network protectors 168 in place of limiters 17 at the load ends of the feeder circuits. One of the purposes of such network protectors is to provide proper selectivity for the fault Y occurring between a generator and the associated feeder circuits. The conditions under which current limiters may be employed may be briefly summarized.

If the electrical distribution system is energized by more than three generators, current limiters may be employed throughout and proper selectivity is assured under all conditions.

Should the possibility of the fault Y occurring between the generator 100 and the associated feeder circuits be so remote that they may be disregarded, current limiters also may be employed throughout the distribution system.

With the foregoing exceptions, it may be desirable to employ network protectors at the load ends of the feeder circuits.

Although the invention has been discussed with reference to certain specific embodiments thereof, numerous modifications are possible. Therefore, the invention is to be restricted only by the accompanying claims as interpreted in view of the prior art.

I claim as my invention:

1. In an electrical distribution system, a distribution circuit having a plurality of stations thereon, a plurality of sources of electrical energy for supplying electrical energy to said distribution circuit, each of said sources of electrical energy being associated with a separate one of said stations, a plurality of feeder circuits connecting each of said sources of electrical energy to its associated station on said distribution circuit, and protective means in each of said feeder circuits for interrupting the associated feeder circuit in response to a predetermined abnormal condition thereof.

2. In an electrical distribution system, a distribution circuit having a plurality of stations thereon, a plurality of sources of electrical energy for supplying electrical energy to said distribution circuit, each of said sources of electrical energy being associated with a separate one of said stations, at least three feeder circuits, connecting each of said sources of electrical energy to its associated station on said distribution circuit for independently transmitting electrical energy from each of said sources to said distribution circuit, and protective means in each end of each of said feeder circuits for independently removing each of said feeder circuits from service in response to a predetermined abnormal condition thereof.

3. In an electrical distribution system, a distribution circuit having a plurality of stations thereon, a plurality of sources of electrical energy for supplying electrical energy to said distribution circuit, each of said sources of electrical energy being associated with a separate one of said stations, a plurality of feeder circuits connecting each of said sources of electrical energy to its associated station on said distribution circuit for independently transmitting electrical energy from each of said sources to said distribution circuit, and current-responsive means in each end of each of said feeder circuits for independently removing each of said feeder circuits from service in response to an abnormal current flow therethrough, said current-responsive means operating with inverse time delay.

4. In an electrical distribution system, a distribution circuit having a plurality of stations thereon, a plurality of sources of electrical energy for supplying electrical energy to said distribution circuit, each of said sources of electrical energy being associated with a separate one of said stations, at least three feeder circuits connecting each of said sources of electrical energy to its associated station on said distribution circuit, and protective means in each of said feeder circuits for interrupting the associated feeder circuit in response to a predetermined abnormal condition thereof.

5. In an electrical distribution system, a distribution circuit having a plurality of stations thereon, a plurality of sources of electrical energy for supplying electrical energy to said distribution circuit, each of said sources of electrical energy being associated with a separate one of said stations, at least three feeder circuits connecting each of said sources of electrical energy to its associated station on said distribution circuit for independently transmitting electrical energy from each of said sources to said distribution circuit, and protective means in each end of each of said feeder circuits for independently removing each of said feeder circuits from service in response to a predetermined abnormal condition thereof.

6. In an electrical distribution system, a distribution circuit having a plurality of stations thereon, a plurality of generators of electrical energy for supplying electrical energy to said distribution circuit, each of said generators being associated with a separate one of said stations, a plurality of feeder circuits connecting each of said generators of electrical energy to its associated station on said distribution circuit, and protective means in each of said feeder circuits for interrupting the associated feeder circuit in response to a predetermined abnormal condition thereof, the feeder circuits connecting each of said generators to said distribution circuit having a combined continuous capacity sufficient to carry the overload capacity of the associated generator.

7. In an electrical distribution system, a distribution circuit having a plurality of stations thereon, a plurality of generators of electrical energy for supplying electrical energy to said distribution circuit, each of said generators being associated with a separate one of said stations, a plurality of feeder circuits connecting each of said generators of electrical energy to its associated station on said distribution circuit for independently transmitting electrical energy from each of said generators at the generator voltage to said distribution circuit, and protective means in each end of each of said feeder circuits for independently removing each of said feeder circuits from service in response to a predetermined abnormal condition thereof, the feeder circuits connecting each of said generators to said distribution circuit having a combined continuous capacity sufficient to carry substantially the overload capacity of the associated generator.

8. In an electrical distribution system, a plurality of parallel loop circuits, a plurality of spaced buses each connecting said parallel loop circuits to define a plurality of sections of said parallel loop circuits, a plurality of sources of electrical energy, and means connecting each of said sources to a separate one of said spaced buses for transmitting electrical energy from said sources to said parallel loop circuits.

9. In an electrical distribution system, a plurality of parallel loop circuits, a plurality of spaced buses each connecting said parallel loop circuits to define a plurality of sections of said parallel loop circuits, a plurality of sources of electrical energy, means connecting each of said sources to a separate one of said spaced buses for transmitting electrical energy from said sources to said parallel loop circuits, and protective means at each end of each section of said parallel loop circuits for independently removing the associated section from service in response to an abnormal condition thereof.

10. In an electrical distribution system, a plurality of parallel loop circuits, a plurality of spaced buses each connecting said parallel loop circuits to define a plurality of sections of said parallel loop circuits, a plurality of sources of electrical energy, means connecting each of said sources to a separate one of said spaced buses for transmitting electrical energy from said sources to said parallel loop circuits, and current responsive means at each end of each section of said parallel loop circuits for independently removing the associated section from service in response to an abnormal current flow therethrough, said current responsive means operating with inverse time delay.

11. In an electrical distribution system, a plurality of parallel loop circuits, a plurality of spaced buses each connecting said parallel loop circuits to define a plurality of sections of said parallel loop circuits, a plurality of sources of electrical energy, means connecting each of said sources to a separate one of said spaced buses for transmitting electrical energy from said sources to said parallel loop circuits, and means associated with each of said buses for dividing the associated bus into a plurality of sections each connected to a separate one of said parallel loop circuits in response to a predetermined abnormal system condition.

12. In an electrical distribution system, a plurality of parallel loop circuits, a plurality of spaced buses each connecting said parallel loop circuits to define a plurality of sections of said parallel loop circuits, a plurality of sources of electrical energy, means connecting each of said sources to a separate one of said spaced buses for transmitting electrical energy from said sources to said parallel loop circuits, protective means at each end of each section of said parallel loop circuits for independently removing the associated section from service in response to an abnormal condition thereof, and means associated with each of said buses for opening the associated bus between said parallel circuits in response to an abnormal current flow therethrough.

13. In an electrical distribution system, a plurality of parallel loop circuits, a plurality of spaced buses each connecting said parallel loop circuits to define a plurality of sections of said parallel loop circuits, a plurality of sources of electrical energy, means connecting each of said sources to a separate one of said spaced buses for transmitting electrical energy from said sources to said parallel loop circuits, and means for connecting electrical load means to said buses.

14. In an electrical distribution system, a plurality of parallel loop circuits, a plurality of spaced buses each connecting said parallel loop circuits to define a plurality of sections of said parallel loop circuits, a plurality of sources of electrical energy, means connecting each of said sources to a separate one of said spaced buses for transmitting electrical energy from said sources to said parallel loop circuits, and means associated with each of said buses for dividing the associated bus into a plurality of sections each connected to a separate one of said parallel loop circuits in response to a predetermined abnormal system condition, and separate means for connecting electrical loads to each section of one of said buses.

15. In an electrical distribution system, at least three parallel loop circuits, a plurality of spaced buses each connecting said parallel loop circuits to define a plurality of sections of said parallel loop circuits, a plurality of sources of electrical energy, means connecting each of said sources to a separate one of said spaced buses for transmitting electrical energy from said sources to said parallel loop circuits, and protective means at each end of each section of said parallel loop circuits for independently removing the associated section from service in response to an abnormal current flow therethrough, said current responsive means operating with inverse time delay.

16. In an electrical distribution system, at least three parallel loop circuits, a plurality of spaced buses each connecting said parallel loop circuits to define a plurality of sections of said parallel loop circuits, a plurality of sources of electrical energy, means connecting each of said sources to a separate one of said spaced buses for transmitting electrical energy from said sources to said parallel loop circuits, and means associated with each of said buses for dividing the associated bus into a plurality of sections each connected to a separate one of said parallel loop circuits in response to a predetermined abnormal current flow therethrough.

17. In an electrical distribution system, a plurality of buses each comprising a plurality of bus sections, protective means associated with each of said buses for connecting the associated bus sections, each of said protective means being responsive to a predetermined abnormal system condition for interrupting the connection between its associated bus sections, a plurality of circuits connecting pairs of said buses, each of said circuits being connected to a separate section of each of its associated buses, protective means for disconnecting each end of each of said circuits from the associated bus section, a source of electrical energy, a plurality of feeder circuits extending between said source of electrical energy and one of said buses, each of said feeder circuits being connected to a separate section of the associated bus, and protective means for disconnecting each of said feeder circuits from the associated bus in response to a predetermined abnormal system condition.

18. In an electrical distribution system, a plurality of electrical generators, a loop circuit, continuous conductive means connecting said electrical generators directly to said loop circuit for energizing said loop circuit substantially at the voltage of said electrical generators, and means for connecting electrical loads directly to said loop circuit for energization therefrom at the voltage of said generators.

19. In an electrical distribution system, a plurality of electrical generators, a loop circuit, continuous conductive means connecting said electrical generators directly to said loop circuit for energizing said loop circuit substantially at the voltage of said electrical generators, means for connecting electrical loads to said loop circuit for energization therefrom, and means responsive to an abnormal system condition for isolating from the remainder of said system a portion of said loop circuit between the points of connection thereto of said electrical generators.

20. In an electrical distribution system, a plurality of electrical generators, a plurality of loop circuits, means connecting each of said electrical generators to each of said loop circuits, and means connecting said loop circuits in parallel at spaced intervals to form a resultant loop distribution circuit.

21. In an electrical distribution system, a plurality of electrical generators, a plurality of loop circuits, means connecting each of said electrical generators to each of said loop circuits, and means connecting said loop circuits in parallel at spaced intervals to form a resultant loop distribution circuit, said last-named means including circuit interrupting means responsive to an abnormal system condition.

22. In an electrical distribution system, a plurality of electrical generators, a plurality of loop circuits, means connecting each of said electrical generators to each of said loop circuits, each of said loop circuits including current-responsive circuit interrupting means on each side of each point of connection thereto of each of said generators, means responsive to an abnormal system condition for controlling the connections of each of said electrical generators to each of said loop circuits, and means connecting said loop circuits in parallel at spaced intervals to form a resultant loop distribution circuit.

23. In an electrical distribution system, a plurality of electrical generators, a plurality of loop circuits, means connecting each of said electrical generators to each of said loop circuits, each of said loop circuits including current-responsive circuit interrupting means on each side of each point of connection thereto of each of said generators, means responsive to an abnormal system condition for controlling the connection of each of said electrical generators to each of said loop circuits, and current-responsive interrupting means normally connecting said loop circuits between adjacent points of connection thereto of said electrical generators.

24. In an electrical distribution system, a plurality of electrical generators, a plurality of loop circuits, means connecting each of said electrical generators to each of said loop circuits, and means connecting said loop circuits in parallel at spaced intervals to form a resultant loop distribution circuit, said last-named means including circuit interrupting means responsive to an abnormal system condition, said interrupting means operating with inverse time delay.

25. In an electrical distribution system, a plurality of electrical generators, a plurality of loop circuits, means connecting each of said electrical generators to each of said loop circuits, each of said loop circuits including current-responsive circuit interrupting means on each side of each point of connection thereto of each of said generators, insensitive means directionally responsive to current flow for controlling the connection of each of said electrical generators to each of said loop circuits, and means connecting said loop circuits at spaced intervals.

26. In an electrical distribution system, a plurality of buses each comprising at least three bus sections, protective means associated with each of said buses for connecting the associated bus sections, each of said protective means being responsive to a predetermined abnormal system condition for interrupting the connection between its associated bus sections, at least three circuits connecting pairs of said buses, each of said circuits being connected to a separate section of each of its associated buses, protective means for disconnecting each end of each of said circuits from the associated bus section, a source of electrical energy, at least three feeder circuits extending between said source of electrical energy and one of said buses, each of said feeder circuits being connected to a separate section of the associated bus, and protective means for disconnecting each of said feeder circuits from the associated bus in response to a predetermined abnormal system condition.

27. In an electrical distribution system, a plurality of buses each comprising at least three bus sections, protective means associated with each of said buses for connecting the associated bus sections, each of said protective means being responsive to a predetermined abnormal system condition for interrupting the connection between its associated bus sections, at least three circuits connecting pairs of said buses, each of said circuits being connected to a separate section of each of its associated buses, protective means for disconnecting each end of each of said circuits from the associated bus section, a plurality of generators of electrical energy, a plurality of feeder circuits extending directly between each of said generators and a separate one of said buses for energizing the associated bus substantially in accordance with the generator voltage, each of said feeder circuits being connected to a separate section of the associated bus and protective means for disconnecting each of said feeder circuits from the associated bus in response to a predetermined abnormal system condition.

28. In an electrical distribution system, a plurality of buses each comprising a plurality of bus sections, protective means associated with each of said buses for connecting the associated bus sections, each of said protective means being responsive to a predetermined abnormal system condition for interrupting the connection between its associated bus sections, a plurality of circuits connecting pairs of said buses, each of said circuits being connected to a separate section of each of its associated buses, protective means for disconnecting each end of each of said circuits from the associated bus section, a plurality of electrical energy sources, a plurality of feeder circuits extending between each of said sources of electrical energy and one of said buses, each of said feeder circuits being connected to a separate section of the associated bus, and protective means for disconnecting each of said feeder circuits from the associated bus in response to a predetermined abnormal system condition, the continuous combined capacity of the circuits connecting said buses, and the continuous combined capacity of the feeder circuits connected to one of said sources of electrical energy each being sufficient to carry substantially the overload capacity of one of said sources of electrical energy.

29. In an electrical distribution system, a plurality of buses each comprising at least three bus sections, protective means associated with each of said buses for connecting the associated bus sections, each of said protective means being responsive to a predetermined abnormal system condition for interrupting the connection between its associated bus sections, at least three circuits connecting pairs of said buses to form a loop having at least three circuits in parallel between each pair of said buses, each of said circuits being connected to a separate section of each of its associated buses, protective means for disconnecting each end of each of said circuits from the associated bus section, a plurality of generators of electrical energy, a plurality of feeder circuits extending directly between each of said generators and a separate one of said buses for energizing the associated bus substantially in accordance with the generator voltage, each of said feeder circuits being connected to a separate section of the associated bus, and protective means at each end of each of said feeder circuits for removing said feeder circuit from service when a fault occurs thereon.

30. In an electrical distribution system, a plurality of buses each comprising at least three bus sections, protective means associated with each of said buses for connecting the associated bus sections, each of said protective means being responsive to a current condition for interrupting the connection between its pair of associated bus sections, at least three circuits connecting said buses to form a loop having at least three circuit sections in parallel between each pair of said buses, each of said circuits being connected to a separate section of each of its associated buses, current-responsive protective means for disconnecting each end of each of said circuit sections from the associated bus section, means for connecting electrical loads to said buses, a plurality of generators of electrical energy, a plurality of feeder circuits extending directly between each of said generators and a separate one of said buses for energizing the associated bus substantially in accordance with the generator voltage, each of said feeder circuits being connected to a separate section of the associated bus, and current-responsive protective means at each end of each of said feeder circuits for removing said feeder circuit from service when a fault occurs thereon.

31. In an electrical distribution system, a plurality of buses each comprising a plurality of separate bus sections, current-responsive protective means associated with each of said buses for connecting the associated bus sections, each of said protective means being responsive to a predetermined abnormal current therethrough for interrupting the connection between its associated bus sections, a plurality of circuits connecting said buses, each of said circuits having a separate end connected to a separate section of each of its associated buses, current-responsive protective means for disconnecting each end of each of said circuits from the associated bus section, a source of electrical energy, a plurality of feeder circuits extending in parallel between said source of electrical energy and one of said buses, each of said feeder circuits being connected to a separate section of the associated bus, and current-responsive protective means for disconnecting each of said feeder circuits from the associated bus in response to a predetermined abnormal system condition.

JOHN S. PARSONS.